United States Patent [19]

Adachi et al.

[11] Patent Number: 4,707,737

[45] Date of Patent: Nov. 17, 1987

[54] BAND COMPRESSION APPARATUS FOR A VIDEO SIGNAL

[75] Inventors: Mitsunori Adachi; Satoru Tomita, both of Amagasaki, Japan

[73] Assignee: Mitsubishi Kenki Kabushiki Kaisha, Tokyo, Japan

[21] Appl. No.: 883,539

[22] Filed: Jul. 9, 1986

[30] Foreign Application Priority Data

Jul. 9, 1985 [JP] Japan .................................. 60-151990

[51] Int. Cl.$^4$ ......................... H04N 7/12; H04N 11/06
[52] U.S. Cl. ................................... 358/133; 358/138; 358/12; 375/122
[58] Field of Search .................... 358/133, 138, 13, 12; 375/122

[56] References Cited

U.S. PATENT DOCUMENTS

| 4,323,916 | 4/1982 | Dischert et al. | 358/13 |
| 4,396,937 | 8/1983 | Reitmeier et al. | 358/13 |
| 4,468,708 | 8/1984 | Coleman, Jr. | 358/133 |
| 4,589,110 | 5/1986 | Eng et al. | 358/133 |
| 4,602,333 | 7/1986 | Komori | 358/138 |

OTHER PUBLICATIONS

Tsuboi et al., "Fiber-Optic HDTV Transmission Technology", dated Jan. 1985, pp. 4–10.
Yoshino et al., "Digital Frame Memory for Still Picture Television Receivers—Pass Encoding System and Application", dated Apr. 1980, vol. 89, pp. 257–262.
Ouellet et al., "Sampling and Reconstruction of NTSC Video Signals at Twice the Color Subcarrier Frequency", dated Dec. 1981, pp. 1823–1832.

Primary Examiner—Howard W. Britton
Assistant Examiner—John K. Peng
Attorney, Agent, or Firm—Birch, Stewart, Kolasch & Birch

[57] ABSTRACT

A band compression apparatus for transmitting a video signal having three color component signals sampled at a sampling frequency of 2Fs and a gradation of N bits per picture element by a transmission path of a gradation of N bits per sample and a sample transmission frequency 2Fs includes a prefilter for restricting the band of each color component signal; a sub-sample circuit for compressing the respective band restricted color component signal to a sampling frequency Fs; a signal separation switching circuit for separating data of 3n bits comprising the upper n bits of the sub-sampled color component signals $$3n = 2N + k \ (k < N)$$

into two main signals as transmission samples of N bits and a fraction signal of k bits; a fraction signal storage RAM for storing one line video signal portions of said fraction signal; and a signal outputting switching circuit for outputting said stored fraction signal to the transmission path by time compressing the same into a signal of N bits as a first transmission sample during the horizontal blanking period of the video signal, or outputting said sub-sampled signal of N bits as a second transmission sample during the video signal period.

4 Claims, 9 Drawing Figures

----- other field

―――― present field

BAND COMPRESSION APPARATUS FOR A VIDEO SIGNAL

FIELD OF THE INVENTION

The present invention relates to a band compression apparatus for a video signal, and more particularly to an apparatus capable of reducing the transmission information quantity of the video signal.

BACKGROUND OF THE INVENTION

Figure 4:
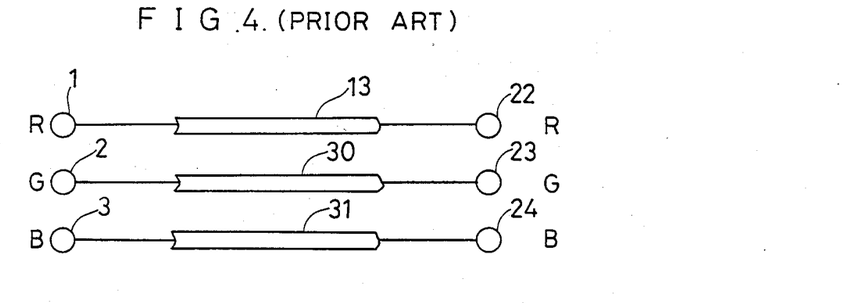
FIG. 4 is a block diagram showing a conventional system without band compression.

FIG. 4 shows a conventional transmission path for video signals without band compression. In FIG. 4 the reference numerals 1, 2, and 3 designate R, G, and B signal digital video input terminals, respectively. The reference numerals 13, 30, and 31 designate data transmission paths for transmitting the signals from the input terminals 1, 2, and 3, respectively. The reference numerals 22, 23, and 24 designate R, G, and B signal digital video output terminals, respectively, for outputting the signal from the data transmission paths 13, 30, and 31 to the outside.

Figure 5:
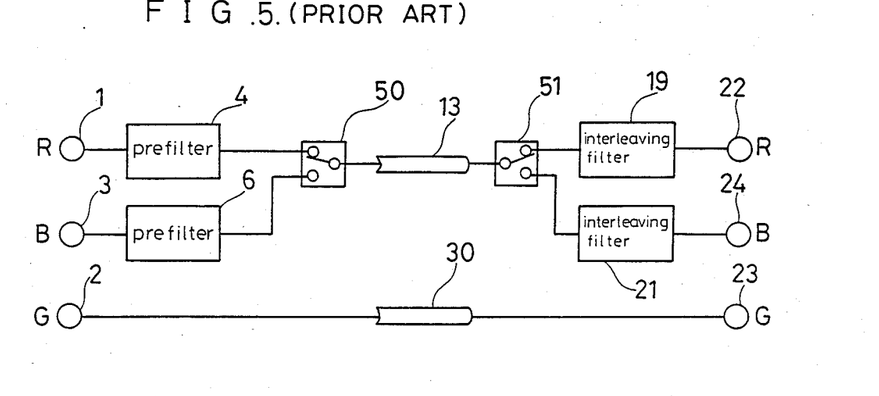
FIG. 5 is a block diagram showing a prior art band compression apparatus which utilizes the PASS method as a band compression method.

FIG. 5 shows a conventional band compression apparatus for video signals using the PASS (Phase Alternative Sub-Nyquist Sampling) system as a band compression method. In FIG. 5, the same reference numerals designate the same or corresponding elements as those shown in FIG. 4. The reference numeral 4 designates a sub-sampling prefilter for restricting the band of the signal from the R signal digital video input terminal 1 before the sub-sampling. The reference numeral 6 designates a sub-sampling prefilter for restricting the band of the signal from the B signal digital video input terminal 3 before the sub-sampling. The reference numeral 50 designates a switch for switching the output between the sub-sampling prefilter 4 and the output of the sub-sampling prefilter 6 at each one picture element. The reference numeral 13 designates a data transmission path for transmitting the output of the switch 50 to the receiver's side. The reference numeral 51 designates a switch for switching the output from the data transmission path 13 at each one picture element. The reference numeral 19 designates a sub-sampling interpolating filter for generating an interpolating value from the output of the switch 51. The reference numeral 21 designates a sub-sampling interpolating filter for generating an interpolating value from the output of the switch 51. The reference numeral 30 designates a transmission path for transmitting the signal from the G signal digital video input terminal 2. The reference numeral 22 designates an R signal digital video output terminal for outputting the output from the sub-sampling interpolating filter 19 to the outside. The reference numeral 23 designates a G signal digital video output terminal for outputting the output from the transmission path 30 to the outside. The reference numeral 24 designates a B signal digital video output terminal for outputting the output from the sub-sampling interpolating filter 21 to the outside.

Figure 7:
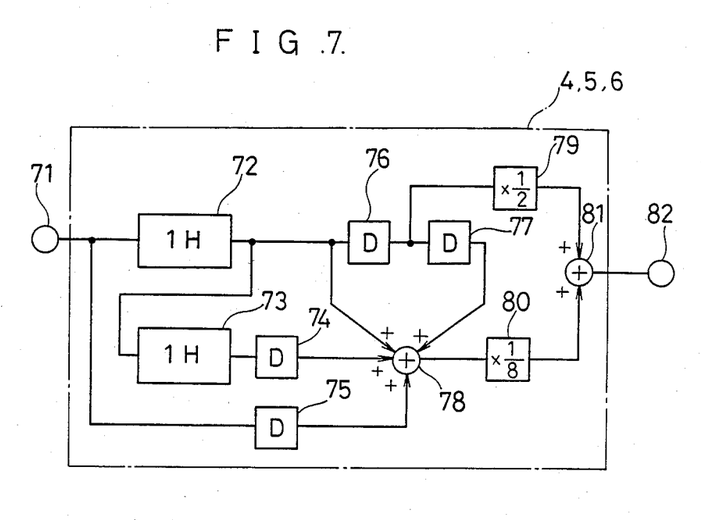
FIG. 7 is a block diagram showing a sub-sampling prefilter which is used in the 1H type PASS method.
Figure 8:
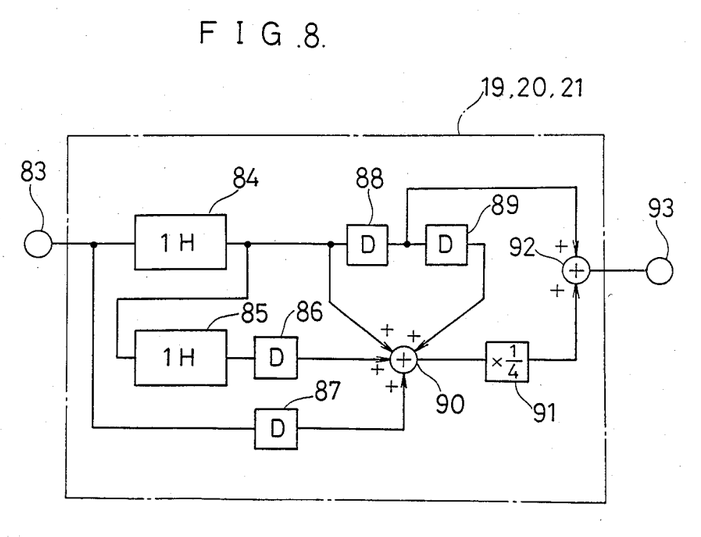
FIG. 8 is a block diagram showing a sub-sampling interpolating filter which is used in the 1H type PASS method.

FIGS. 7 and 8 show examples of a sub-sampling prefilter and a sub-sample interpolating filter of FIG. 5, respectively.

In FIG. 7, the reference numeral 71 designates a digital video input terminal, the numeral 72 designates a 1H delay line for delaying the output from the digital video input terminal 71 by one line. The numeral 73 designates a 1H delay line for delaying the output of the 1H delay line 72 by one line. The numeral 74 designates a one picture element delay line for delaying the output of the 1H delay line 73 by one picture element. The numeral 75 designates a one picture element delay line for delaying the signal from the digital video input terminal 71 by one picture element. The numeral 76 designates a one picture element delay line for delaying the output of the 1H delay line 72 by one picture element. The numeral 77 designates a one picture element delay line for delaying the output of the one picture element delay line 76 by one picture element. The numeral 78 designates an adder for adding the output of the 1H delay line 72, the output of the one picture element delay line 77, the output of the one picture element delay line 74, and the output of the one picture element delay line 75. The reference numeral 79 designates a divider for dividing the output of the one picture element delay line 76 by 2 (or a multiplier for multiplying the output of the one picture element delay line 76 by ½). The numeral 80 designates a divider for dividing the output of the adder 78 by 8 (or a multiplier for multiplying the output of the adder 78 by ⅛). The numeral 81 designates an adder for adding the output of the divider 79 and that of the divider 80. The reference numeral 82 designates a digital video output terminal for outputting the output of the adder 81 to the outside.

In FIG. 8, the reference numeral 83 designates a digital video input terminal, the numeral 84 designates a 1H delay line for delaying the output of the digital video input terminal 83 by one line, the numeral 85 designates a 1H delay line for delaying the output of the 1H delay line 84 by one line. The numeral 87 designates a one picture element delay line for delaying the signal from the digital video input terminal 83 by one picture element. The numeral 86 designates a one picture element delay line for delaying the output of the 1H delay line 85 by one picture element. The numeral 88 designates a one picture element delay line for delaying the output of the 1H delay line 84 by one picture element. The numeral 89 designates a one picture element delay line for delaying the output of the one picture element delay line 88 by one picture element. The numeral 90 designates an adder for adding the output of the 1H delay line 84, the output of the one picture element delay line 86, the output of the one picture element delay line 87, and the output of the one picture element delay line 89. The numeral 91 designates a divider for dividing the output of the adder 90 by 4 (or a multiplier for multiplying the output of the adder 90 by ¼). The numeral 92 designates an adder for adding the output of the one picture element delay line 88 and the output of the divider 91. The numeral 93 designates a digital video output terminal for outputting the output of the adder 92 to the outside.

The device operates as follows.

First of all, the operation of the conventional system shown in FIG. 4 will be described. A color video signal is usually processed and transmitted by being decomposed into three original colors of light, that is, an R signal (red), a G signal (green), and a B signal (blue). In FIG. 4, the R signal video information input to the R signal digital video input terminal 1 is transmitted by the transmission path 13 to the receiver's side, and is output from the R signal digital video output terminal 22. Similarly as above, the G signal video information input to the G signal digital video input terminal 2 is transmitted by the transmission path 30 to the receiver's side, and is output from the G signal digital video output terminal 23. Similarly as above the B signal video information input to the B signal digital video input terminal 3 is transmitted by the transmission path 31 to the receiver's side, and is output from the B signal digital video output terminal 24. Now suppose that a video signal is sampled with a gradation of 8 bits per picture element and a sampling frequency of 2Fs=10 MHz, three 80 MBPS (Bit Per Second) transmission paths are required in this transmission system.

A band compression is conducted so as to reduce the number of the required transmission paths. The conventional system utilizing the PASS method as a band compression method will be described with reference to FIGS. 5 to 8.

Figure 6:
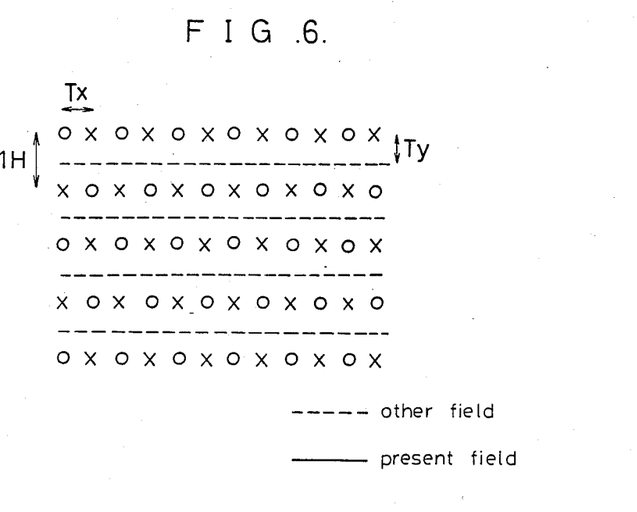
FIG. 6 is a diagram showing the arrangement of the sampling points on the screen for explaining the PASS method.

First of all, the R signal video information input to the R signal digital video input terminal 1 is band restricted by the sub-sampling prefilter 4. On the other hand, the B signal video information input to the B signal digital video input terminal 3 is band restricted by the sub-sampling prefilter 6. The R signal and B signal video information, both band restricted, are switched by the switch 50 at each one picture element to be sub-sampled as shown in FIG. 6. Herein, the mark O designates the position on the screen of the resampling point of the R signal, and the mark X designates the position on the screen of the resampling point of the B signal. Accordingly, the transmission information quantity of the R signal and the B signal become ½, and the output of the switch 50 can be transmitted to the switch 51 at the receiver's side by only a transmission path 13. The signal transmitted to the switch 51 is switched at one picture element, and is decoded to the R signal and the G signal. The decoded R signal is input to the sub-sampling interpolating filter 19. In this filter 19, an interpolating value is generated at the non-sampling point shown by the mark X in FIG. 6 by that data 0 inserted at the non-sampling point. Thus, an R signal digital output is output from the R signal digital video output terminal 22 to the outside.

Similarly as above the decoded B signal is input to the sub-sampling interpolating filter 21. In this filter 21, data 0 is inserted at the non-sampling point, an interpolating value is generated at the non-sampling point shown by the mark O in FIG. 6 by that data 0 inserted at the non-sampling point. Thus, a B signal digital output is output from the B signal digital video output terminal 24 to the outside.

On the other hand, the G signal is input to the G signal digital video input terminal 2, and is transmitted to the receiver's side by the transmission path 30. The transmitted G signal is output as a G signal digital video output from the G signal digital video output terminal 23 to the outside. Two 80 MBPS transmission paths are required in the above described PASS system.

Figure 9:
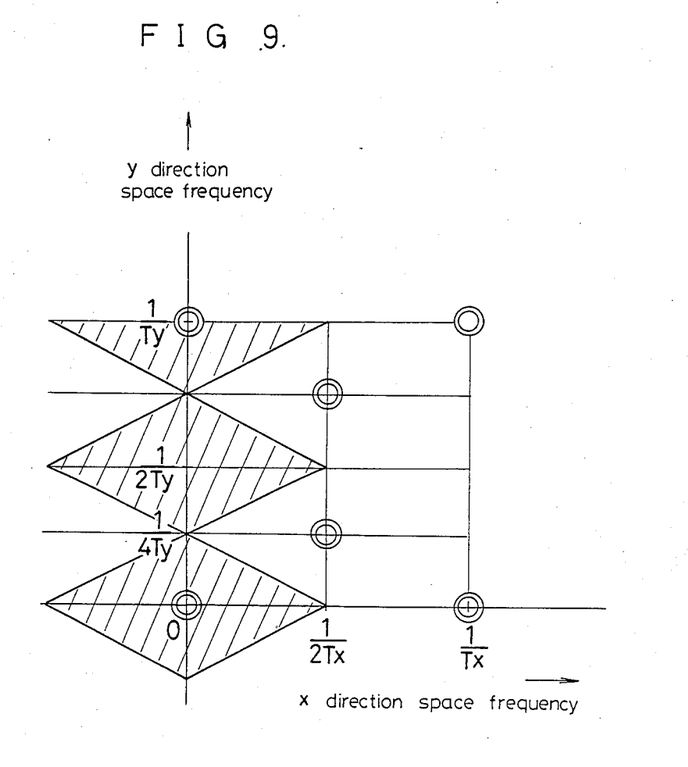
FIG. 9 is a diagram showing a space spectrum distribution of the 1H type PASS method.

The sub-sampling prefilters 4 and 6 shown in FIG. 5 will be described in a greater detail with reference to FIG. 7. When a zigzag-grid shaped sub-sampling shown in FIG. 6 is conducted, the characteristics in a two dimensional space spectrum as shown in FIG. 9 is obtained. In FIG. 9, the alias centers formed by the zigzag-grid shaped sub-sampling appear at positions designated by double circles, and therefore alias noises are usually generated at the regions where the alias signal originated from the alias center and the base-band signal overlap with each other on the spectrum plain. Therefore, it is possible to reproduce picture images accurately on a screen by band restricting the base-band signals into rhombus shaped regions without the alias signals being overlapped with base-band signals. The video signal input to the digital video input terminal 71 of the sub-sampling prefilter shown in FIG. 7 is transmitted in accordance with the transmission characteristics represented by the following formula (1) before it reaches the digital video output terminal 82, whereby the base-band signals are band restricted into the hatched regions shown in FIG. 9 without overlapping with the alias signals originating from the alias centers.

$$H(Z) = \frac{Z^{-l}(1 + Z^{-2}) + Z^{-l}(1 + Z^{-2l}) + 4Z^{-l}Z^{-1}}{8} \quad (1)$$

Herein
 $Z^{-l}$: two line delay on the screen (1H delay of field video signal)
 $Z^{-1}$: one picture element delay on the screen Next, in the sub-sampling interpolating filter shown in FIG. 8, a video signal into which the data 0 is inserted at the dropped sampling point (non-sampling point) is input to the digital video input terminal 83. Accordingly, the dropped sampling point is interleaved by the sub-sampling interpolating filter which realizes the characteristics of the formula (1) before it reaches the digital video output terminal 93.

In this conventional band compression system for a video signal using the PASS method, the compression ratio is ½ because the video signals are compressed at a frequency of ½ of the sampling frequency, and for example, number of the transmission paths is only reduced to two from three which corresponds to the number of R, G, and B signals obtained by decomposing the video information.

SUMMARY OF THE INVENTION

An object of the present invention is to provide an improved band compression apparatus for a video signal capable of reducing number of the required transmission paths from 3 corresponding to the number of the decomposed R, G, and B signals to 1.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a band compression apparatus for a video signal for transmitting a video signal comprising three color component signals sampled at a sampling frequency of 2Fs and a gradation of N bits per picture element by a transmission path of a gradation of N bits per sample and a sample transmission frequency 2Fs: a prefilter for restricting the band of each color component signal; a sub-sampling means for compressing the respective band restricted color component signal to a sampling frequency Fs; a signal separation means for separating the data of 3n bits comprising the upper n bits of the sub-sampled color component signals $$3n = 2N + k \ (k < N)$$

into two main signals as transmission samples of N bits and a fraction signal of k bits; a fraction signal storage means for storing one line video signal portions of said fraction signal; and a signal outputting means for outputting said stored fraction signal to the transmission path by time compressing the same into a signal of N bits as a first transmission sample during the horizontal blanking period of the video signal, or outputting said sub-sampled signal of N bits as a second transmission sample during the video signal period.

DETAILED DESCRIPTION OF THE PREFERRED EMBODIMENTS

Figure 1:
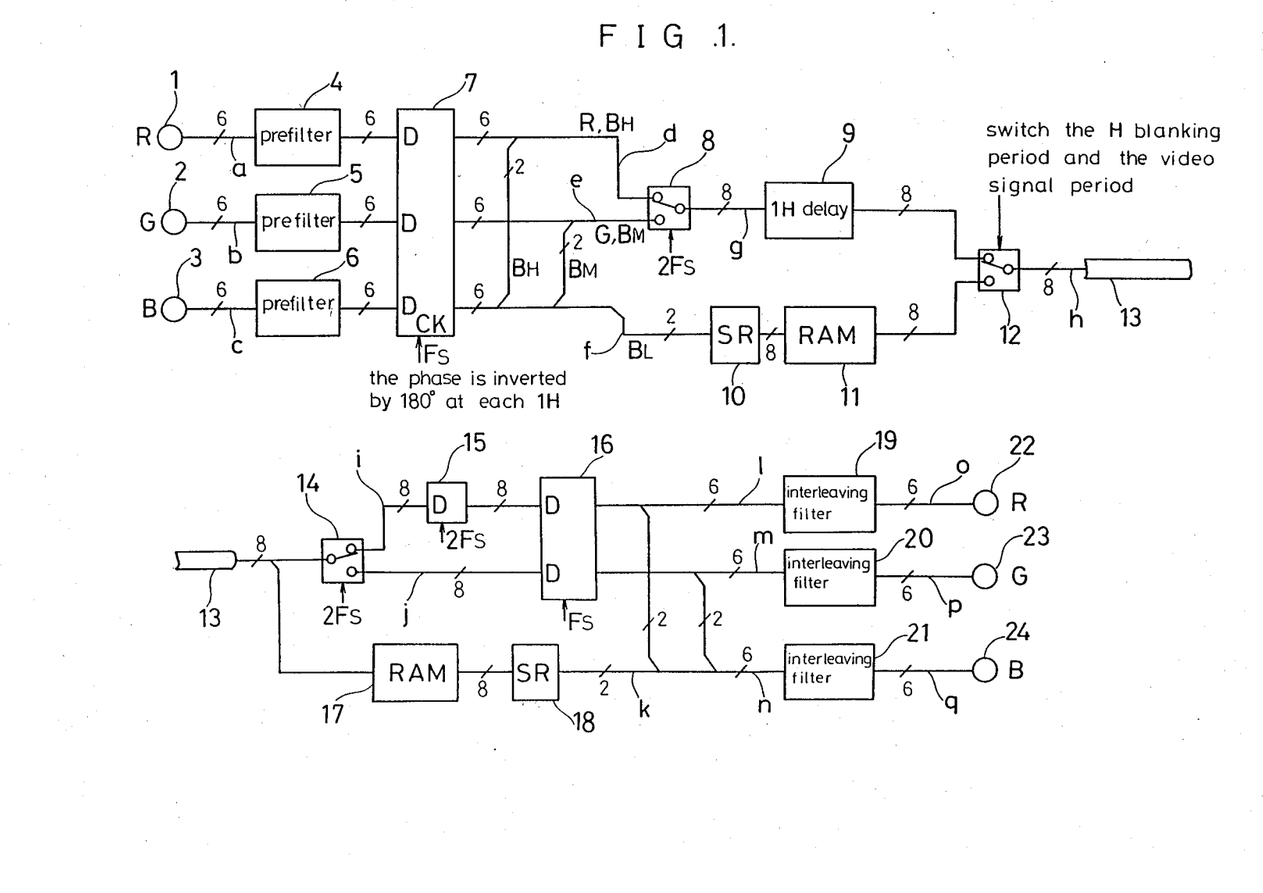
FIG. 1 is a block diagram showing a band compression apparatus for a video signal as a first embodiment of the present invention.

In order to explain the present invention in detail, reference will be particularly made to FIG. 1.

In FIG. 1, the reference numerals 1, 2, and 3 designate an R, G, and B signal digital video input terminals, respectively. The reference numerals 4, 5, and 6 designate sub-sampling prefilters for band restricting the video information from the R, G, and B signal digital video input terminal 1, 2, and 3, respectively. The numeral 7 designates a latch for compressing the output of the sub-sampling prefilter 4, 5, and 6 to one half of the sampling frequency of the input signal. The numeral 8 designates a switch for switching a sequence comprising the 6 bit R signal and the upper 2 bits of the B signal and a sequence comprising the whole 6 bits of the G signal and the middle 2 bits of the B signal from the latch 7 at each picture element. The numeral 9 designates a 1H delay line for delaying the output of the switch 8 by one line. The numeral 10 designates a shift register for producing an 8 bit signal from four clock portions of the lower 2 bits of the B signal from the latch 7. The numeral 11 designates a RAM for storing a 1H period portion of the signal from the shift register 10. The numeral 12 designates a switch for outputting the output of the RAM 11 in a horizontal blanking period (hereinafter referred to as "H blank period") and the output of the 1H delay line 9 in the video signal period. The numeral 13 designates a transmission path of a gradation of 8 bits per sample and a sample transmission frequency of 2Fs for transmitting the output of the switch 12.

The reference numeral 14 designates a switch for outputting a sequence comprising the whole 6 bit of the R signal and the upper 2 bits of the B signal (BH signal) and a sequence comprising the whole 6 bits of the G signal and the middle 2 bits of the B signal (BM signal) from the signal output from the transmission path 13. The numeral 15 designates a one picture element delay line for delaying the output of the switch 14 by one picture element. The numeral 16 designates a latch for latching the output of the switch 14 and the output of the one picture element delay line 15. The numeral 17 designates a RAM into which the BL signal, which is produced by time compressing the lower 2 bits of the B signal, is written in during the H blank period, and from which the BL signal is read out during the video signal period. The numeral 18 designates a shift register for generating a BL signal (the lower 2 bit of the B signal) for each two picture elements from the output of the RAM 17. The numeral 19 designates a sub-sampling interpolating filter for obtaining an interpolating value from the output of the latch 16. The numeral 20 designates a sub-sampling interpolating filter for obtaining an interpolating value from the output of the latch 16. The reference numeral 21 designates a sub-sampling interpolating filter for obtaining an interpolating value using the upper 2 bits and the middle 2 bits of the B signal obtained from the latch 16 and the lower 2 bits of the B signal obtained from the shift register 18. The reference numeral 22 designates an R signal digital video output terminal for outputting the output of the sub-sampling interpolating filter 19 to the outside. The numeral 23 designates a G signal digital video output terminal for outputting the output of the sub-sampling interpolating filter 20 to the outside. The numeral 24 designates a B signal digital video output terminal for outputting the output of the sub-sampling interpolating filter 21 to the outside.

Figure 2:
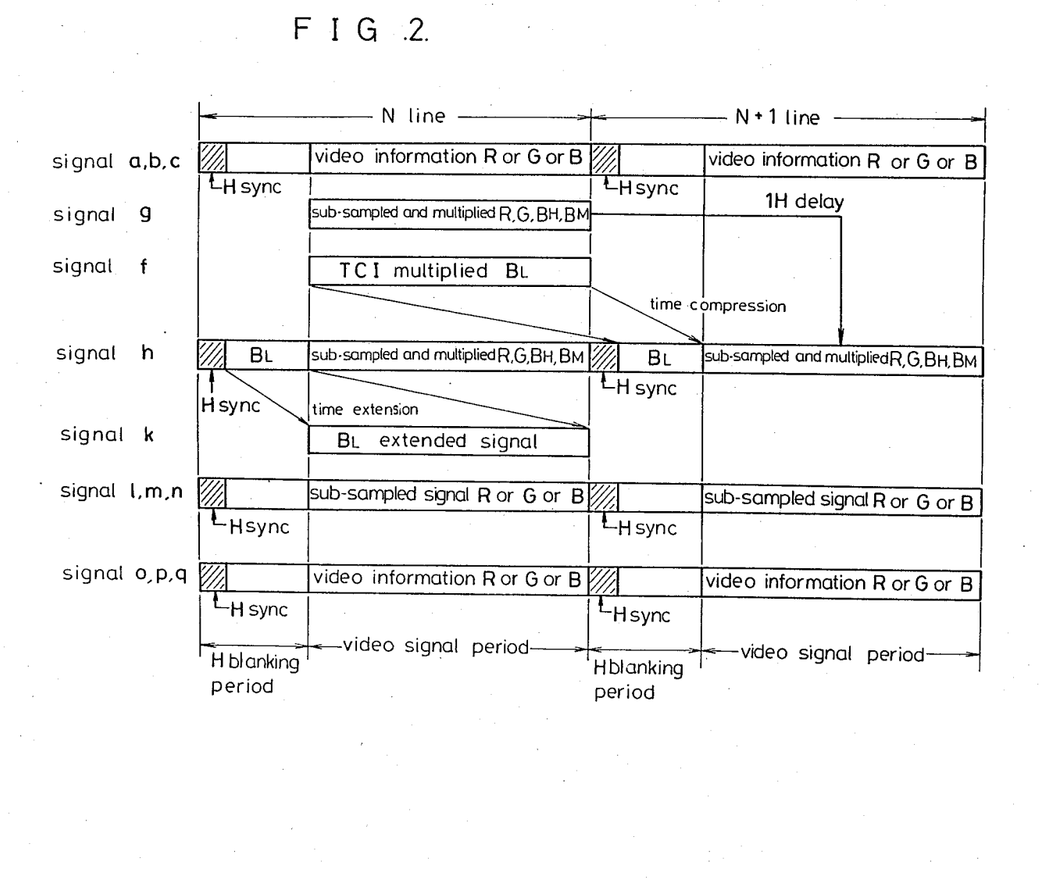
FIG. 2 is a timing chart for explaining the operation of the device of FIG. 1.

The operation of the device will be described with reference to FIGS. 1 and 2.

The R signal, G signal, and B signal are analog-to-digital converted at the gradation of 6 bits per picture element and a sampling frequency of 2Fs, and each of them is input to the R, G, and B signal digital video input terminals 1, 2, and 3, respectively. These correspond to the signals a, b, and c in the timing chart of FIG. 2. In these signals in usual analog form the H blank period occupies about 1/5 of 1 line. In the digitized signals a large portion of the H blank period is empty because the digitized horizontal synchronous signal (H sync) has a short code as shown in FIG. 2.

The R signal input to the R signal digital video input terminal 1 is band restricted by the sub-sampling prefilter 4. Similarly as above, the G signal input to the G signal digital video input terminal 2 is band restricted by the sub-sampling prefilter 5, and the B signal input to the B signal digital video input terminal 3 is band restricted by the sub-sampling prefilter 6. Each band restricted signal is sub-sampled by the latch 7 with the use of the clock of frequency Fs having an inverted phase at each line, and an 8 bit signal d comprising the whole 6 bits of the sub-sampled R signal and the upper 2 bits of the B signal (BH signal), and an 8 bit signal e comprising the whole 6 bits of the sub-sampled G signal and the third and the fourth bits of the B signal (BM signal) are obtained. These signals d and e are switched by the switch 8 with the use of the clock of frequency 2Fs to be time multiplied, whereby a signal g as a first transmission sample is obtained. On the other hand, four picture element portions of the signal f which is the lower 2 bits of the sub-sampled B signal (BL signal) are stored at the shift register 10, and one line portions of an 8 bit signal are stored at the RAM 11 as time compressed signals. Next, this one line portion of the BL signal stored at the RAM 11 is read out as a second transmission sample at a portion after the H sync signal of the horizontal blanking period of the next scanning line, and is input to the switch 12. The signal g is delayed by 1 line by 1H delay line 9, and is input to the switch 12. The switch 12 selects the output of the RAM 11 (the second transmission sample) during the horizontal blanking period, and selects the output of the 1H delay line 9 (the first transmission sample) during the video signal period. Accordingly, the output of the switch 12 becomes a signal h as shown in FIG. 2 at the receiver's side. This signal h is sent out to the transmission path 13.

Next, at the receiver's side the signal h from the transmission path 13 is separated into an 8 bit signal comprising the 6 bit R signal and the BH signal and an 8 bit signal comprising the 6 bit G signal and the BM signal by the switch 14, which signals are hereinafter designated by i and j, respectively. The signal i is delayed by one picture element by the one picture element delay line 15 to become the same phase as that of frequency the signal j, and is latched with the clock of Fs by the latch 16, the 6 bit R signal and the BH signal are both output at the sampling frequency Fs, and the 6 bit G signal and the BM signal are both output at the sampling frequency Fs. This 6 bit R signal is hereinafter designated by l, and the 6 bit B signal is hereinafter designated by m.

On the other hand, the BL signal from the transmission path 13 is written into the RAM 17 during the horizontal blanking period, read out from the RAM 17 during the video signal period, and this 8 bit signal is decomposed into four picture element portions by the shift register 18, and a time extension is conducted thereto. The B signal becomes a 6 bit signal having a sampling frequency Fs comprising the signals BH, BM, and BL. The signals l, m, and n are sub-sampled signals of sampling frequency Fs, and interpolating values therefore are generated by the sub-sampling interpolating filters 19, 20, and 21, and signals o, p, and q of sampling frequency 2Fs are output from the R, G, and B signal digital video output terminal 22, 23, and 24, respectively.

Figure 3:
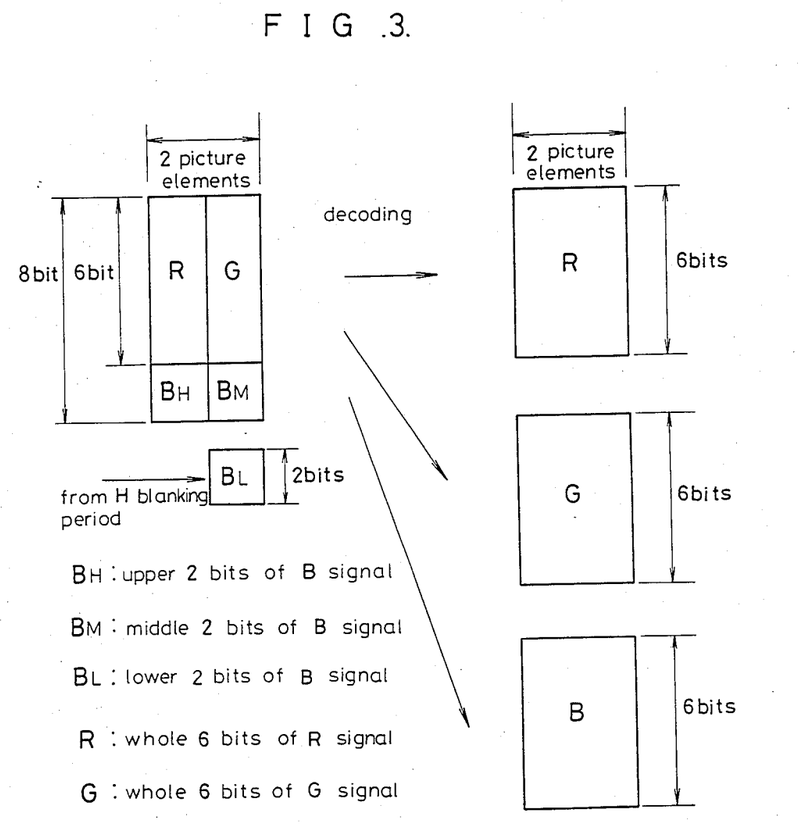
FIG. 3 is a diagram for explaining the signal multiplying method of the above embodiment.

The signal multiplexing method of the present embodiment will be described with reference to FIG. 3. In FIG. 3, the sub-sampled R, G, and B signals are only required to be transmitted as 6 bit signals one time for each 2 picture elements, and therefore it is only required that 3×6=18 bits are transmitted for each 2 picture elements. However, it is only possible to transmit 16 bits for each 2 picture elements by the transmission path of the gradation of 8 bits per picture element and of a sample transmission frequency 2Fs. Therefore the remaining 2 bits are transmitted by being time compressed into a horizontal blanking period, and these remaining 2 bits are obtained from the horizontal blanking period by the time extension at the receiver's side. These decoded R, G, and B signals become a 6 bit signal effective as a picture element in the period of 2 picture elements.

In the above embodiment with such a construction a portion of the B signal is transmitted during the H blank period by being time compressed, and therefore it is possible to transmit a sufficient quality video information signal by only a single transmission path compared with that the conventional PASS method which requires two transmission paths.

Although the R, G, and B signals are arranged in a special order for simplification in the illustrated embodiment, the input positions of the R, G, and B signal digital video input terminals can be arbitrarily changed.

Although the BH, BM, and BL signals are generated by selecting particular bits of the B signal, but the BH signal may be an arbitrary 2 bit signal among the whole 6 bits of the B signal, the BM signal may be an arbitrary 2 bits signal among the remaining 4 bit of the B signal, and the BL signal may be the remaining 2 bit signal. Furthermore, the bit number per transmission sample in the illustrated embodiment may be a value other than 8.

In the illustrated embodiment, the present invention is applied to a 1H type PASS, but any type of sub-sampling method can be used by selecting a sub-sampling prefilter and a sub-sampling interpolating filter which have characteristics appropriate to the sub-sampling system and establishing the sub-sampling timing of the both filters and the latch.

As is evident from the foregoing description, according to the present invention, a portion of the video information is sub-sampled, and is time compressed and time multiplied to be transmitted during the horizontal blanking period which is usually empty, whereby only a single transmission path is required without any deterioration in the picture quality.

What is claimed is:

1. A band compression apparatus for transmitting a video signal comprising three color component signals sampled at a sampling frequency of 2Fs and a gradation of N bits per picture element, through a transmission path of a gradation of N bits per sample and a sample transmission frequency of 2Fs comprising:
   a prefilter for restricting the band of each color component signal;
   sub-sampling means for compressing the respective band restricted color component signal to a sampling frequency Fs;
   signal separation means for separating data of 3n bits comprising the upper n bits of the sub-sampled color component signals $$3n = 2N + k \; (k < N)$$

into two main signals as transmission samples of N bits and a fraction signal of k bits;
   fraction signal storage means for storing one line video signal portions of said fraction signal; and
   signal outputting means for outputting said stored fraction signal to the transmission path by time compressing said fraction signal into a signal of N bits as a first transmission sample during a horizontal blanking period of the video signal, or outputting said sub-sampled signal of N bits as a second transmission sample during the video signal period of the video signal.

2. The apparatus defined in claim 1, wherein said sub-sampling means comprises a latch for sub-sampling the band restricted color component signals at a frequency of Fs.

3. The apparatus defined in claim 2, wherein said signal separation means comprises a switch for switching the sub-sampled color component signals from the latch into two signals of an N bit color component signal and a k bit fractional color component signal.

4. The apparatus defined in claim 1, wherein said fraction signal storage means comprises a RAM.

* * * * *